United States Patent Office 3,823,179
Patented July 9, 1974

3,823,179
AMIDINOTHIOCARBAMATES
Julius Jakob Fuchs, 1104 Greenway Road, Forwood,
Wilmington, Del. 19803
No Drawing. Filed Dec. 7, 1972, Ser. No. 312,904
Int. Cl. C07c 129/12
U.S. Cl. 260—468 E                    4 Claims

ABSTRACT OF THE DISCLOSURE

Certain novel amidinocarbamates and amidinothiocarbamates are broad spectrum herbicides, which can be applied to the locus of undesired vegetation either preemergence or postemergence. A typical representative of this class of compounds is methyl N-(N-cyclohexylcarbamoyl-N',N'-dimethylamidino)-N-methylcarbamate.

BACKGROUND OF THE INVENTION

This invention relates to certain novel herbicidal amidinocarbamates and amidinothiocarbamates.

Many herbicidal ureas, amides, and biurets are known. Some of them are useful to total herbicides, others as selective herbicides; some are useful preemergence, others postemergence, still others both preemergence and postemergence. Certain herbicides are particularly well suited for application in aqueous dispersions, others in nonaqueous dispersions. There thus is a great variety of herbicidal compounds to satisfy a great variety of needs and conditions. Yet, additional herbicidal candidates are continually synthesized and evaluated in the expectation that some of these compounds will be more active, more specific, cheaper, or more conveniently formulated than those already on the market. There exists, therefore, a need for new herbicides.

SUMMARY OF THE INVENTION

According to the present invention, it has now been discovered that certain novel amidinocarbamates and amidinothiocarbamates are effective and readily available herbicides. The compounds of this invention can be represented by the following Formula (1):

$$R_1NH-\overset{X_1}{\underset{}{C}}-N=\overset{R_3}{\underset{R_2}{C}}-\overset{R_4}{\underset{}{N}}-\overset{X_2}{\underset{}{C}}-R_5 \quad (1)$$

wherein $R_1$ is a $C_1$–$C_8$ alkyl, a $C_3$–$C_4$ alkenyl, a $C_3$–$C_6$ alkynyl, a $C_3$–$C_8$ cycloalkyl, a $C_5$–$C_8$ cycloalkenyl, a $C_4$–$C_{10}$ cycloalkylalkyl, a $C_7$–$C_{10}$ bicycloalkyl, phenyl, or benzyl;

each alkyl or alkenyl being substituted with 0–3 chlorine atoms; 0–1 bromine or iodine atom; 0–7 fluorine atoms; or 0–1 methoxy, ethoxy, methylthio, ethylthio, cyano, carboxyl, methoxycarbonyl, ethoxycarbonyl, or acetyl group;

each cycloalkyl or bicycloalkyl being substituted with 0–3 chlorine atoms, 0–1 bromine atom, 0–2 methyl groups, or 0–1 $C_2$–$C_4$ alkyl; and each phenyl or benzyl being substituted with 0–2 halogen atoms; methyl groups, or ethyl groups; or 0–1 $C_3$–$C_4$ alkyl, nitro, $C_1$–$C_4$ alkoxy, $C_1$–$C_4$ alkylthio, cyano, or trifluoromethyl group;

$R_2$ is a $C_1$–$C_3$ alkyl;
$R_3$ is hydrogen, methyl, or ethyl;
$R_4$ is a $C_1$–$C_4$ alkyl, a $C_3$–$C_4$ alkenyl, a $C_3$–$C_4$ alkynyl, or methoxyl;
$R_5$ is —$OR_6$; —$SR_6$, or —$NR_7R_8$; wherein $R_6$ is a $C_1$–$C_8$ alkyl substituted with 0–3 chlorine atoms or 0–1 methoxyl; or phenyl substituted with 0–3 chlorine atoms, 0–2 nitro or methyl groups, or 0–1 methoxyl; each of $R_7$ and $R_8$ independently is hydrogen or a $C_1$–$C_4$ alkyl; and each of $X_1$ and $X_2$ independently is oxygen or sulfur.

The compounds of this invention can be applied to the locus of weeds either preemergence or postemergence and provide excellent protection against a broad spectrum of weeds.

DETAILED DESCRIPTION OF THE INVENTION

Especially highly active and, therefore, preferred compounds of the present invention are those compounds represented by the above Formula (1), wherein $R_1$ is a $C_3$–$C_6$ alkyl, a $C_3$–$C_8$ cycloalkyl, or phenyl;
$R_2$ is methyl;
$R_3$ is hydrogen or methyl;
$R_4$ is methyl;
$R_5$ is $OR_6$ or $SR_6$, where $R_6$ is a $C_1$–$C_4$ alkyl or phenyl; and
each of $X_1$ and $X_2$ is oxygen.

Within this preferred class, the particularly preferred group of compounds having the highest herbicidal activity consists of those compounds of Formula (1) in which $R_1$ is a $C_3$–$C_4$ alkyl or cyclohexyl,
$R_3$ is methyl, and
$R_5$ is $OR_6$.

The compounds of the present invention can be made by methods well known in the art. The following reaction sequence I, which illustrates the preparation of methyl N-(N-cyclohexylcarbamoyl - N',N' - dimethylamidino)-N-methylcarbamate, is suitable for the preparation of most of the compounds contemplated by this disclosure:

Sequence I (A)
$$H_2N-CN + CH_3O-\overset{O}{\underset{}{C}}-Cl \xrightarrow{NaOH} CH_3O-\overset{O}{\underset{}{C}}-\underset{Na}{N}-CN$$

$$CH_3O-\overset{O}{\underset{}{C}}-\underset{Na}{N}-CN + (CH_3)_2SO_4 \longrightarrow CH_3O-\overset{O}{\underset{}{C}}-\underset{CH_3}{N}-CN$$

(B)
$$CH_3O-\overset{O}{\underset{}{C}}-\underset{CH_3}{N}-CN \xrightarrow[2)NaOH]{1)HN(CH_3)_2 \cdot HCl} CH_3O-\overset{O}{\underset{}{C}}-\underset{CH_3}{N}-\overset{CH_3\;CH_3}{\underset{}{C}}=NH$$

(C)
$$CH_3O-\overset{O}{\underset{}{C}}-\underset{CH_3}{N}-\overset{CH_3\;CH_3}{\underset{}{C}}=NH + \underset{}{\overset{NCO}{\diagup}} \longrightarrow$$

$$CH_3O-\overset{O}{\underset{}{C}}-\underset{CH_3}{N}-\overset{CH_3\;CH_3}{\underset{}{C}}=N-\overset{O}{\underset{}{C}}-NH\diagup$$

Other compounds contemplated by this disclosure can be synthesized by a reaction of appropriate alkylcyanamides with $$R_5-\overset{X_2}{\underset{}{C}}-Cl,$$

where $R_5$ and $X_2$ have the above-defined meaning, except that when $R_5$ is

$X_2$ is oxygen. This reaction is shown below as the first step of Sequence II.

Sequence II

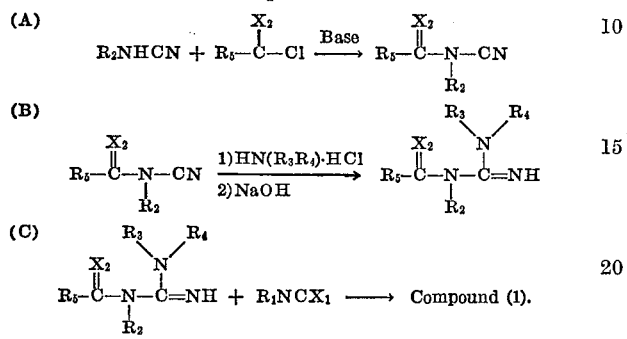

These preparations are described in the following Examples, wherein all the proportions, parts, and percentages are by weight.

EXAMPLE 1

(A) Synthesis of Methoxycarbonylmethylcyanamide

To a solution of 504 parts of a 50% aqueous cyanamide solution in 825 parts of water at 25° C. are added during a period of 90 minutes and at a pH of 6.9–7.1 simultaneosuly 572 parts of methyl chloroformate and 945 parts of a 50% aqueous sodium hydroxide solution. As the addition of the reactants progresses, the temperature of the reaction is allowed to rise to 53–55° C. and is maintained within that range by cooling. When the addition is complete, the reaction mass is cooled to 25° C., whereupon crystallization of the sodium salt of methoxycarbonylcyanamide occurs. Dimethyl sulfate (775 parts) is then added, and agitation of the reaction mass is continued while maintaining the pH at 7–7.1 by a dropwise addition of about 25 parts of a 50% aqueous sodium hydroxide solution. After 6.5 hours, the resulting two phase solution is repeatedly extracted with methylene chloride and the extract is dried. One half of the methylene chloride extract is then evaporated under vacuum, and the residue is distilled at 50° C./0.5 mm. There is obtained 237.6 parts of methoxycarbonylmethylcyanamide (69.5% yield).

(B) Synthesis of Methoxycarbonyltrimethylguanidine

A solution of 339 parts of dimethylamine hydrochloride in 500 parts of water is heated to 50° C., and the remaining one half of the above methylene chloride extract is added to it gradually, while at the same time removing the methylene chloride by distillation. The resulting two-phase mixture is then heated for approximately 20 hours at 80° C., after which time the starting methoxycarbonylmethylcyanamide has nearly completely disappeared. The solution is then cooled to 0° C., and 336 parts of a 50% aqueous sodium hydroxide solution is added. Repeated extraction of the reaction solution with methylene chloride and evaporation of the methylene chloride under vacuum gives 228.6 parts of crude methoxycarbonyltrimethylguanidine of 84.4% purity, from which the pure product is isolated by distillation at 72° C./0.5 mm.

(C) Synthesis of Methyl N-(N-cyclohexylcarbamoyl-N',N'-dimethylamidino)-N-methylcarbamate To 14.8 parts of the above crude methoxycarbonyltrimethylguanidine in 50 parts of methylene chloride is added 11.0 parts of cyclohexyl isocyanate. The solution temperature reaches the boiling point, and when the temperature has fallen to 25° C., the solvent is evaporated under vacuum to give an oil, which crystallizes when triturated with ether. Recrystallization from a mixture of carbon tetrachloride and petroleum ether gives pure methyl N-(N-cyclohexylcarbamoyl - N',N'-dimethylamidino)-N-methylcarbamate, m.p. 93–94° C.

Using appropriate starting materials, the following compounds can be prepared in a similar manner.

TABLE I methyl N-(N-methylcarbamoyl-N',N'-dimethylamidino)-N-methylcarbamate methyl N-(N-cycloheptylcarbamoyl-N',N'-dimethylamidino)-N-methylcarbamate methyl N-(N-cyclooctylcarbamoyl-N'-butylamidino)-N-methylcarbamate methyl N-(N-cyclopentylcarbamoyl-N'-allylamidino)-N-methylcarbamate methyl N-(N-cyclopropylcarbamoyl-N',N'-dimethylamidino)-N-methylcarbamate methyl N-[N-(2-methylcyclohexylcarbamoyl)-N',N'-dimethylamidino]-N-methylcarbamate methyl N-(N-neopentylcarbamoyl-N',N'-dimethylamidino)-N-methylcarbamate ethtyl N-(N-octylcarbamoyl-N',N'-dimethylamidino)-N-methylcarbamate ethyl N-(N-propargylcarbamoyl-N',N'-dimethylamidino)-N-methylcarbamate ethyl N-[N-(3-propylpropargylcarbamoyl)-N',N'-dimethylamidino]-N-methylcarbamate ethyl N-[N-allylcarbamoyl-N'-(2-methylallyl)amidino]-N-methylcarbamate ethyl N-[N-(3-methylallylcarbamoyl)-N',N'-dimethylamidino]-N-methylcarbamate ethyl N-[N-(2-cyclopentenylcarbamoyl)-N',N'-dimethylamidino]-N-methylcarbamate butyl N-[N-(2-cyclooctenylcarbamoyl)-N',N'-dimethylamidino]-N-methylcarbamate butyl N-(N-cyclopropylmethylcarbamoyl)-N',N'-dimethylamidino)-N-methylcarbamate octyl N-[N-(2-cyclooctylethylcarbamoyl)-N',N'-dimethylamidino]-N-methylcarbamate octyl N-[N-(1-methylcyclopropylcarbamoyl)-N',N'-dimethylamidino]-N-methylcarbamate octyl N-[N-(2,6-dimethylcyclohexylcarbamoyl)-N',N'-dimethtylamidino]-N-methylcarbamate octyl N-[N-(2-norbornylcarbamoyl)-N',N'-dimethylamidino]-N-methylcarbamate octyl N-[N-(2-chloroethylcarbamoyl)-N',N'-dimethylamidino]-N-methylcarbamate trichloromethyl N-[N-(2-bromoethylcarbamoyl)-N',N'-dimethylamidino]-N-methylcarbamate trichloromethyl N-[N-(2-fluoroethylcarbamoyl)-N',N'-dimethylamidino]-N-methylcarbamate trichloromethyl N-[N-(1-trichloromethylethylcarbamoyl)-N',N'-dimethytlamidino]-N-methylcarbamate trichloromethyl N-[N-(2-iodoethylcarbamoyl)-N',N'-dimethylamidino]-N-methylcarbamate chloromethyl N-[N-(2-methoxyethylcarbamoyl-N'-N'-dimethylamidino]-N-methylcarbamate chloromethyl N-[N-(2-ethoxybutylcarbamoyl)-N',N'-dimethylamidino]-N-methylcarbamate chloromethyl N-[N-(2-ethylthiopropylcarbamoyl)-N',N'-dimethylamidino]-N-methylcarbamate chloromethyl N-[N-(1-cyano-1-methylethylcarbamoyl)-N',N'-dimethylamidino]-N-methylcarbamate methoxymethyl N-(N-cyclohexylcarbamoyl-N'-methyl-N'-ethylamidino)-N-ethylcarbamate methoxymethyl N-[N-(1-methoxyethylcarbamoyl)-N',N'-dimethylamidino]-N-ethylcarbamate methoxymethyl N-[N-(1-carboxyethylcarbamoyl)-N',N'-dimethylamidino]-N-ethylcarbamate methoxymethyl N-[N-(1-ethoxycarbonylethylcarbamoyl)-N',N'-dimethylamidino]-N-ethylcarbamate propyl N-[N-(2-methylthiobutylcarbamoyl)-N',N'-
  dimethylamidino]-N-ethylcarbamate
methyl N-[N-(1-methylcyclohexylcarbamoyl)-N',N'-
  dimethylamidino]ethylcarbamate
methyl N-[N-(1-acetylbutylcarbamoyl)-N',N'-
  dimethylamidino]-N-ethylcarbamate
phenyl N-[N-(2-butylcyclopentylcarbamoyl)-N',N'-
  dimethylamidino]-N-methylthiolcarbamate
phenyl N-[N-(3-chloronorbornylcarbamoyl)-N',N'-
  dimethylamidino]-N-methylthiolcarbamate
2,4-dichlorophenyl N-[N-(2,2,3-trichloronorbornyl-
  carbamoyl)-N',N'-dimethylamidino]-N-
  methylthiolcarbamate
p-chlorophenyl N-[N-(2-bromonorbornylcarbamoyl)-
  N',N'-dimethylamidino]-N-methylthiolcarbamate
p-chlorophenyl N-[N-(1-chloro-2-propenylcarbamo-
  yl)-N',N'-dimethylamidino]-N-methylthiol-
  carbamate
p-chlorophenyl N-[N-(1-bromo-2-propenylcarbamo-
  yl)-N',N'-dimethylamidino]-N-methylthiol-
  carbamate
methyl N-[N-(o-methylthiophenylcarbamoyl)-N'-
  methylamidino]-N-methylcarbamate
methyl N-[N-(p-butylthiophenylcarbamoyl)-N'-
  methylamidino]-N-methylcarbamate
methyl N-[N-(p-cyanophenylcarbamoyl)-N'-ethyl-
  amidino]-N-methylcarbamate
methyl N-[N-(2-chloro-4-butylphenylcarbamoyl)-
  N'-propargylamidino]-N-methylcarbamate
methyl N-[N-(2-bromo-4-nitrophenylcarbamoyl)-
  N'-(3-methylpropargyl)amidino]-N-
  methylcarbamate
methyl N-[N-(3-fluoro-4-methoxyphenylcarbamoyl)-
  N'-butylamidino]-N-methylcarbamate
methyl N-[N-(2-iodo-4-butoxyphenylcarbamoyl)-
  N'-allylamidino]-N-methylcarbamate
methyl N-[N-(2-chloro-4-methylthiophenylcarbamoyl)-
  N'-(2-methylallyl)amidino]-N-methylcarbamate
methyl N-[N-(2-bromo-5-methylthiophenylcarbamoyl)-
  N'-ethyl-N'-methylamidino]-N-methylcarbamate
methyl N-[N-(2-iodo-6-cyanophenylcarbamoyl)-
  N',N'-diethylamidino]-N-methylcarbamate
methyl N-[N-(2-fluoro-4-trifluoromethylphenylcar-
  bamoyl)-N'-methoxy-N'-methylamidino]-N-
  methylcarbamate
methyl N-[N-(2-methyl-4-butylphenylcarbamoyl)-N'-
  butyl-N'-methylamidino]-N-methylcarbamate
2,4-dimethylphenyl N-[N-(m-isopropylphenylcarbam-
  oyl)-N'-butylamidino]-N-methylcarbamate
2,4-dimethylphenyl N-[N-(o-butylphenylcarbamoyl)-
  N',N'-dimethylamidino]-N-methylcarbamate
p-methoxyphenyl N-[N-(p-nitrophenylcarbamoyl)-
  N',N'-dimethylamidino]-N-methylcarbamate
methyl N-[N-(2,4-dichlorophenylcarbamoyl-N',N'-
  dimethylamidino]-N-methylcarbamate
methyl N-[N-(1-carboxyl-2-propenylcarbamoyl)-
  N',N'-dimethylamidino]-N-methylcarbamate
methyl N-[N-(2-decahydronaphthylcarbamoyl)-
  N',N'-dimethylamidino]-N-methylcarbamate
methyl N-[N-(1-methyl-2-norbornylcarbamoyl)-
  N',N'-dimethylamidino]-N-methylcarbamate
methyl N-[N-(1,1-dimethyl-2-norbornylcarbamoyl)-
  N',N'-dimethylamidino]-N-methylcarbamate
methyl N-[N-(1-ethyl-2-norbornylcarbamoyl)-N',N'-
  dimethylamidino]-N-methylcarbamate
methyl N-[N-perfluoroallylcarbamoyl)-N',N'-
  dimethylamidino]-N-methylcarbamate
methyl N-[N-(2-butyl-3-norbornylcarbamoyl)-N',N'-
  dimethylamidino]-N-methylcarbamate
methyl N-[N-(p-tolylcarbamoyl)-N',N'-dimethyl-
  amidino]-N-methylcarbamate
methyl N-[N-(m-ethylbenzylcarbamoyl)-N',N'-
  dimethylamidino]-N-methylcarbamate
methyl N-[N-(2,4-dimethylbenzylcarbamoyl)-N',N'-
  dimethylamidino]-N-methylcarbamate
methyl N-[N-(2,4-diethylbenzylcarbamoyl)-N',N'-
  dimethylamidino]-N-methylcarbamate
methyl N-[N-(p-propylbenzylcarbamoyl)-N',N'-
  dimethylamidino]-N-methylcarbamate
methyl N-[N-(o-butylbenzylcarbamoyl)-N',N'-
  dimethylamidino]-N-methylcarbamate
methyl N-[N-(2,4-dichlorobenzylcarbamoyl)-N',N'-
  dimethylamidino]-N-methylcarbamate
methyl N-[N-(1-methoxycarbonyl-1-methylethylcar-
  bamoyl)-N',N'-dimethylamidino]-N-
  methylcarbamate
methyl N-[N-(1-ethoxycarbonyl-1-methyl-2-pro-
  penylcarbamoyl)-N',N'-dimethylamidino]-
  N-methylcarbamate
methyl N-[N-(p-chlorobenzylcarbamoyl)-N',N'-
  dimethylamidino]-N-methylcarbamate
methyl N-[N-(p-nitrobenzylcarbamoyl)-N',N'-
  dimethylamidino]-N-methylcarbamate
methyl N-[N-(o-butoxybenzylcarbamoyl)-N',N'-
  dimethylamidino]-N-methylcarbamate
methyl N-[N-(p-methylthiobenzylcarbamoyl)-N',N'-
  dimethylamidino]-N-methylcarbamate
methyl N-[N-(o-butylthiobenzylcarbamoyl)-N',N'-
  dimethylamidino]-N-methylcarbamate
methyl N-[N-(p-cyanobenzylcarbamoyl)-N',N'-
  dimethylamidino]-N-methylcarbamate
methyl N-[N-(m-trifluorobenzylcarbamoyl)-N',N'-
  dimethylamidino]-N-methylcarbamate
methyl N-[N-(m-methoxybenzylcarbamoyl)-N',N'-
  dimethylamidino]-N-methylcarbamate

EXAMPLE 2

To a solution of 56 parts of methylcyanamide in 200 parts of methylene chloride is added 200 parts of water. To the well agitated two-phase system is then added simultaneously at a pH of 6.5–7.5, 126.5 parts of methyl chlorodithiocarbonate and 80 parts of 50% aqueous sodium hydroxide at a temperature of 35–40° C. When the addition is completed, the methylene chloride layer, which contains the dissolved methylthiolthiocarbonylmethylcyanamide, is separated contacted with dimethylamine hydrochloride to give methylthiolthiocarbonyltrimethylguanidine, as described in Example 1, Section B. This compound reacts with cyclohexyl isocyanate, as described in Section C of Example 1, to give methyl N-(N-cyclohexylcarbamoyl - N',N' - dimethylamidino)-N-methyldithiocarbamate.

Using appropriate starting materials, the following compounds can be prepared in a similar manner:

TABLE II methyl N-[N-(2-chlorocyclohexylcarbamoyl-N',N'-
  dimethylamidino]-N-propylcarbamate
methyl N-[N-(2,2,3-trichlorocyclohexylcarbamoyl)-
  N',N'-dimethylamidino]-N-propylcarbamate
phenyl N-[N-(3-bromocyclohexylcarbamate
  dimethylamidino]-N-propylcarbamate
phenyl N-[N-(2-ethylcyclohexylcarbamoyl)-N',N'-
  dimethylamidino]-N-propylcarbamate
methyl N-[N-(2,4-dimethylphenylcarbamoyl)-N'-
  methoxyamidino]-N-isopropylcarbamate
methyl N-[N-(2-methyl-4-nitrophenylcarbamoyl)-N',N'-
  dimethylamidino]-N-isopropylcarbamate
m-tolyl N-[N-(m-iodophenylcarbamoyl)-N'-propargyl-
  amidino]-N-isopropylcarbamate
m-tolyl N-[N-(p-tolylcarbamoyl)-N'-methoxyamidino]-
  N-isopropylcarbamate
2,4,5-trichlorophenyl N-[N-(1-iodo-2-propenylthiocar-
  bamoyl)-N',N'-dimethylamidino]-N-methylthio-
  carbamate
2,4,5-trichlorophenyl N-[N-(1-fluoro-2-propenylthio-
  carbamoyl)-N',N'-dimethylamidino]-N-methyl-
  thiocarbamate 2,4,5-trichlorophenyl N-[N-(1-methoxy-2-propenylthio-
  carbamoyl)-N',N'-dimethylamidino]-N-methyl-
  thiocarbamate
p-nitrophenyl N-[N-(1-ethoxy-2-propenylthiocarbam-
  oyl)-N',N'-dimethylamidino]-N-methylthiocar-
  bamate
p-nitrophenyl N-[N-perfluoroisopropylthiocarbamoyl)-
  N',N'-dimethylamidino]-N-methylthiocarbamate
p-nitrophenyl N-[N-(1-methylthio-2-propenylcarbam-
  oyl)-N',N'-dimethylamidino]-N-methylthio-
  carbamate
m-nitrophenyl N-[N-(1-ethylthio-2-propenylcarbamoyl)-
  N',N'-dimethylamidino]-N-methylthiocarbamate
m-nitrophenyl N-[N-(1-cyano-1-methyl-2-propenyl-
  carbamoyl)-N',N'-dimethylamidino]-N-methyl-
  thiocarbamate
m-nitrophenyl N-[N-(1-methoxycarbonyl-1-methyl-2-
  propenylcarbamoyl)-N',N'-dimethylamidino]-N-
  methylthiocarbamate
2,4-dinitrophenyl N-[N-(1-acetyl-1-methyl-2-propenyl-
  carbamoyl)-N',N'-dimethylamidino]-N-methyl-
  dithiocarbamate
2,4-dinitrophenyl N-[N-(m-bromophenylcarbamoyl)-
  N',N'-dimethylamidino]-N-methyldithiocarbamate
methyl N-[N-(m-methoxyphenylcarbamoyl)-N',N'-
  dimethylamidino]-N-methyldithiocarbamate
methyl N-[N-(p-butoxyphenylcarbamoyl)-N',N'-
  dimethylamidino]-N-methyldithiocarbamate
2-cyclohexylcarbamoyl-3-dimethylcarbamoyl-1,1,3-
  trimethylguanidine
3-carbamoyl-2-(3-methyl-4-methoxyphenylcarbamoyl)-
  1,1,3-trimethylguanidine
3-butylcarbamoyl-2-(3-ethyl-4-butoxyphenylcarbamoyl)-
  1,1,3-trimethylguanidine
3-(N-ethyl-N-methylcarbamoyl)-2-(2-methyl-4-methyl-
  thiophenylcarbamoyl)-1,1,3-trimethylguanidine
3-(N-butyl-N-methylcarbamoyl)-2-(2,4-diethylphenyl-
  carbamoyl)-1,1,3-trimethylguanidine
3-dimethylcarbamoyl-2-(2-methyl-5-cyanophenylcar-
  bamoyl)-1,1,3-trimethylguanidine
2-(2-ethyl-5-trifluoromethylphenylcarbamoyl)-3-methyl-
  carbamoyl-1,1,3-trimethylguanidine The compounds of Formula (1) can be used wherever general weed control is desired, for example, in industrial areas, railroad rights-of-way, and areas adjacent to croplands in agricultural areas.

The precise amount of active material to be used in any given situation will vary according to the plant and soil involved, the formulation used, the mode of application, prevailing weather conditions, foliage density and like factors. It is, therefore, not possible to recommend a rate of application suitable for all situations. Broadly speaking, the compounds of the invention are used at levels of about 1 to about 25 kilograms per hectare.

The compounds of the present invention may be combined with all other herbicides and are particularly useful in combination with 3-sec-butyl-5-bromo-6-methyluracil (bromacil), 3-(3,4-dichlorophenyl)-1,1-dimethylurea (diuron), 1,1'-dimethyl-4,4'-bipyridinium salt (paraquat), 1,1-dimethyl-3,3-(N-tert-butylcarbamoyloxyphenyl)urea, 4-amino-6-tert-butyl - 3 - methylthio-as-triazin-5(4H)-one, and s-triazines such as 2-chloro-4-ethylamino-6-isopropylamino-s-triazine, for controlling a broad spectrum of weeds.

Many of the compounds of this invention possess unusually high water solubility, up to several percent. This offers an advantage in, for instance, control of brush and other deep-rooted, perennial weeds. An example of a highly water-soluble compound of this invention is methyl N-(N-cyclohexylcarbamoyl-N',N' - dimethylamidino)-N-methylcarbamate; this compound exhibits a solubility in water of about 22.7% at 25° C.

The herbicidal activity of the compounds of this invention was discovered in a greenhouse test. In this test seeds of crabgrass (*Digitaria* spp.), barnyardgrass (*Echinochloa crusgalli*), sorghum (*Sorghum vulgare*), wild oats (*Avena fatua*), Cassia tora, morningglory (*Ipomoea* spp.), radish (*Raphanus* spp.), marigold (*Tagetes* spp.), dock (*Rumex crispus*), bean, corn, soybean, rice, wheat and nutsedge tubers were planted in a growth medium and treated preemergence at two rates (11 and 2.2 kg. per hectare) with the chemical dissolved in a non-phytotoxic solvent. At the same time cotton having five leaves (including cotyledonary ones), johnsongrass (*Sorghum halepense*) having four leaves, crabgrass and barnyardgrass with three leaves and nutsedge (*Cyperus rotundus*) from tubers with two leaves were treated postemergence at 11 kg. per hectare, and bush beans with the third trifoliate leaf expanding and sorghum with four leaves were treated postmergence at 2.2 kg. per hectare. Treated plants and controls were maintained in the greenhouse for sixteen days, then all species were compared to controls and visually rated for responses to treatment. A quantitative rating was made on a scale of 0 to 10; a rating of 10 means complete kill; a rating of 0 means no injury. A qualitative rating (type of injury) was also made; the letter "C" indicates chlorosis.

The results obtained for methyl N-(N-cyclohexylcarbamoyl - N',N' - dimethylamidino)-N-methylcarbamate are shown in Table III below:

TABLE III

| Kg. per hectare | Postemergence | | | | Preemergence | | | | | | | | | | |
|---|---|---|---|---|---|---|---|---|---|---|---|---|---|---|---|
| | Nut-sedge | Johnson-grass | Crab-grass | Barnyard-grass | Crab-grass | Barnyard-grass | Sor-ghum | Wild oats | Nut-sedge | Cas-sia | Morning-glory | Mus-tard | Rad-ish | Mari-gold | Dock |
| 11 | 9C | 10C | 10C | 10C | 10C | 10C | 10C | 10C | 4C | 10C | 10C | 10C | 10C | 10C | 10C |
| 2.2 | | | | | 10C | 10C | 10C | 10C | 3C | 10C | 10C | 10C | 10C | 10C | 10C |

Useful formulations of the compounds of Formula (1) can be prepared in conventional ways. They include dusts, granules, pellets, solutions, suspensions, emulsions, wettable powders, emulsifiable concentrates and the like. Many of these may be applied directly. Sprayable formulations can be extended in suitable media and used at spray volumes of from a few pints to several hundred gallons per acre. High strength compositions are primarily used as intermediates for further formulation. The formulations, broadly, contain about 1% to 99% by weight of at least one compound of Formula (1) and either about 0.1% to 15% of a surfactant or about 1% to 99% of a solid or liquid carrier or both. More specifically, the formulations will contain these ingredients in the following approximate proportions:

| | Percent by weight | | |
|---|---|---|---|
| | Active ingredient | Carrier | Surfactant |
| Wettable and watersoluble powders | 20–95 | 0–80 | 0–10 |
| Oil suspensions, emulsions, solutions (including emulsifiable concentrates) | 5–50 | 40–95 | 0–15 |
| Dusts | 1–25 | 70–99 | 0–5 |
| Granules and pellets | 1–95 | 5–99 | 0–15 |
| High strength compositions | 90–99 | 0–10 | 0–2 |

Lower or higher levels of active ingredient can, of course, be present depending on the intended use and the physical properties of the compound. Higher ratios of surfactant to active ingredient are sometimes desirable.

Typical solid carriers are described in Watkins et al., "Handbook of Insecticide Dust Diluents and Carriers," 2nd. Edn., Dorland Books, Caldwell, N.J., 1955. Less common carriers include sugars and inorganic salts. The more absorptive carriers are preferred for wettable powders and the denser ones for dusts. Typical liquid carriers are described in Marsden, "Solvents Guide," 2nd. Edn., Interscience, New York, 1950. Solubility under 0.1% is preferred for suspensions concentrates; solution concentrates are preferably stable against phase separation at 0° C. "McCutcheon's Detergents and Emulsifiers Annual," Allured Publ. Corp., Ridgewood, N.J., as well as Sisely and Wood, "Encyclopedia of Surface Active Agents," Chemical Pbl. Co., Inc., New York, 1964, list surfactants and recommended uses. All formulations can contain minor amounts of additives to reduce foam, caking, corrosion, microbiological growth, etc. Preferably, ingredients should be approved by the U.S. Environmental Protection Agency for the intended use.

The method of making such compositions are well known. Solutions are prepared by simply mixing the ingredients. Fine solid compositions are made by blending and, usually, grinding as in a hammer or fluid energy mill. Suspensions are prepared by wetmilling (see, for example, Littler, U.S. Pat. 3,060,084). Granules and pellets may be made by spraying the active material upon preformed granular carriers or by agglomeration techniques; see J. E. Browning, "Agglomeration," *Chemical Engineering*, Dec. 4, 1967, pp. 147ff. and "Perry's Chemical Engineer's Handbook," 4th Edn., McGraw-Hill, N.Y., 1963, pp. 8–59ff.

For further information regarding the art of formulation, see for example:

H. M. Loux, U.S. Pat. 3,235,361.
R. W. Luckenbaugh, U.S. Pat. 3,309,192.
H. Gysin and E. Knüsli, U.S. Pat. 2,891,855.
G. C. Klingman, "Weed Control as a Science," John Wiley & Sons, Inc., New York, 1961, pp. 81–96.
J. D. Fryer and S. A. Evans, "Weed Control Handbook," 5th Edn. Blackwell Scientific Publications, Oxford, 1968, pp. 101–103.

Typical formulations of compounds of the present invention are shown below:

A. Wettable Powder: Percent
Methyl N - (N - cyclohexylcarbamonyl-N',N'-dimethylamidino) - N - methylcarbamate ___ 40
Dioctyl sodium sulfosuccinate _____ 1.5
Sodium lignisulfonate _____ 3
Low viscosity methyl cellulose _____ 1.5
Attapulgite _____ 54

The ingredients are thoroughly blended, passed through an air mill, to produce an average particle size under 15 microns, reblended, and sifted through a U.S.S. No. 50 sieve (0.3 mm. opening) before packaging.

B. Water Soluble Powder: Percent
Methyl N - (N-cyclohexylcarbamoyl-N',N'-dimethylamidino)-N-methylcarbamate _____ 95.0
Dioctyl sodium sulfosuccinate _____ 0.5
Sodium ligninsulfonate _____ 1.0
Synthetic fine silica _____ 3.5

The ingredients are blended and coarsely ground in a hammer mill so that only a few percent of the active exceeds 250 microns (U.S.S. #60 sieve) in size. When added to water with stirring, the coarse powder initially disperses and then the active ingredients dissolves so that no further stirring is needed during application.

C. Oil Suspension: Percent
Methyl N - (N-cyclohexylcarbamoyl-N',N'-dimethylamidino)-N-methylcarbamate _____ 25
Polyoxyethylene sorbitol hexaoleate _____ 5
Highly aliphatic hydrocarbon oil _____ 70

The ingredients are ground together in a sand mill until the solid particles have been reduced to under about 5 microns. The resulting thick suspension may be applied directly, but preferably after being extended with oils or emulsified in water.

D. Extruded Pellet: Percent
Methyl N - (N-cyclohexylcarbamoyl-N',N'-dimethylamidino)-N-methylcarbamate _____ 25
Anhydrous sodium sulfate _____ 10
Crude calcium ligninsulfonate _____ 5
Sodium alkylnaphthalenesulfonate _____ 1
Calcium/mangesium bentonite _____ 59

The ingredients are blended, hammer milled and then moistened with about 12% water. The mixture is extruded as cylinders about 3 mm. diameter which are cut to produce pellets about 3 mm. long. These may be used directly after drying, or the dried pellets may be crushed to pass a U.S.S. No. 20 sieve (0.84 mm. openings). The granules held on a U.S.S. No. 40 sieve (0.42 mm. openings) may be packaged for use and the fines recycled.

In the following composition claims the expression "consisting essentially of" means that, in addition to the components recited in those claims, other components also may be present, provided they do not adversely affect the operability of the compositions for their intended use.

I claim:

1. A compound having the following formula $$R_1NH-\overset{X_1}{\overset{\|}{C}}-N=\overset{R_3\diagdown\diagup R_4}{\underset{R_2}{\overset{\|}{C}}-N-\overset{X_2}{\overset{\|}{C}}-R_5}$$

wherein $R_1$ is a $C_3$–$C_6$ cycloalkyl, a $C_5$–$C_8$, a $C_4$–$C_{10}$ cycloalkyl, or a $C_7$–$C_{10}$ bicycloalkyl;
each cycloalkyl or bicycloalkyl being substituted with 0–3 chlorine atoms, 0–1 bromine atom, 0–2 methyl groups, or 0–1 $C_2$–$C_4$ alkyl;
$R_2$ is a $C_1$–$C_3$ alkyl;
$R_3$ is hydrogen, methyl, or ethyl;
$R_4$ is a $C_1$–$C_4$ alkyl, methoxyl, $C_3$–$C_4$ alk-2-enyl or $C_3$–$C_4$ alk-2-ynyl;
$R_5$ is —$OR_6$ wherein $R_6$ is a $C_1$–$C_8$ alkyl substituted with 0–3 chlorine atoms or 0–1 methoxyl;
each of $X_1$ and $X_2$ is oxygen.

2. A compound of claim 1 wherein $R_1$ is a $C_3$–$C_8$ cycloalkyl; $R_2$ is methyl; $R_3$ is hydrogen or methyl; $R_4$ is methyl; $R_5$ is —$OR_6$, $R_6$ being a $C_1$–$C_4$ alkyl.

3. A compound of claim 2 wherein $R_1$ is cyclohexyl; $R_3$ is methyl; and $R_5$ is —$OR_6$.

4. Methyl N-(N-cyclohexylcarbamoyl-N',N'-dimethylamidino)-N-methylcarbamate, a compound of claim 3.

References Cited

UNITED STATES PATENTS 3,274,230  9/1966  Braun _____ 260—465.5
3,564,041  2/1971  Farrissey et al. _____ 260—471

OTHER REFERENCES

Junod: Helvectica Chimica Acta., vol. 35, (1952), pp. 1005–1015.

JAMES A. PATTEN, Primary Examiner

M. SHIPPEN, Assistant Examiner

U.S. Cl. X.R.

71—99, 100, 106, 111, 118, 119, 120; 260—455 A, 465 D, 465.4, 468 R, 470, 471 C, 479 C, 481 C, 482 C, 552 R, 553 R, 553 A

PO-1050
(5/69)

UNITED STATES PATENT OFFICE
CERTIFICATE OF CORRECTION

Patent No. 3,823,179      Dated July 9, 1974

Inventor(s) Julius Jakob Fuchs

It is certified that error appears in the above-identified patent and that said Letters Patent are hereby corrected as shown below:

The compound named at column 6, lines 58-59 reading phenyl N-[N-(3-bromocyclohexylcarbamate dimethylamidino]-N-propylcarbamate should read phenyl N-[N-(3-bromocyclohexylcarbamoyl)-N',N'-dimethylamidino]-N-propylcarbamate.

In claim 1, the definition of $R_1$ appearing at column 10, lines 35-36 reading $R_1$ is a $C_3$-$C_6$ cycloalkyl, a $C_5$-$C_8$, a $C_4$-$C_{10}$ cycloalkyl, or a $C_7$-$C_{10}$ bicycloalkyl;

should read $R_1$ is a $C_3$-$C_8$ cycloalkyl, a $C_5$-$C_8$ cycloalk-2-enyl, a $C_4$-$C_{10}$ cycloalkylalkyl, or a $C_7$-$C_{10}$ bicycloalkyl;

In the heading of the above-identified patent, at column 1, lines 3-4, the assignee is not recited. The heading at lines 3-4 should read Julius Jakob Fuchs, Wilmington, Del., assignor to E. I. du Pont de Nemours and Company, Wilmington, Del.

Signed and sealed this 7th day of January 1975.

(SEAL)
Attest:

McCOY M. GIBSON JR.
Attesting Officer

C. MARSHALL DANN
Commissioner of Patents